United States Patent
Shetty et al.

(10) Patent No.: US 11,783,819 B2
(45) Date of Patent: Oct. 10, 2023

(54) AUTOMATED CONTEXT-SPECIFIC SPEECH-TO-TEXT TRANSCRIPTIONS

(71) Applicant: VMware, Inc., Palo Alto, CA (US)

(72) Inventors: Rohit Pradeep Shetty, Bangalore (IN); Ravish Chawla, Chamblee, GA (US); Adam Chow, Atlanta, GA (US)

(73) Assignee: VMware, INC., Palo Alto, CA (US)

( * ) Notice: Subject to any disclaimer, the term of this patent is extended or adjusted under 35 U.S.C. 154(b) by 283 days.

(21) Appl. No.: 17/366,169

(22) Filed: Jul. 2, 2021

(65) Prior Publication Data

US 2023/0005472 A1  Jan. 5, 2023

(51) Int. Cl.
*G10L 15/22* (2006.01)
*G10L 15/183* (2013.01)
*G10L 15/16* (2006.01)

(52) U.S. Cl.
CPC ............ *G10L 15/183* (2013.01); *G10L 15/16* (2013.01); *G10L 15/22* (2013.01); *G10L 2015/223* (2013.01)

(58) Field of Classification Search
CPC ........ G10L 15/183; G10L 15/22; G10L 15/16
See application file for complete search history.

(56) References Cited

U.S. PATENT DOCUMENTS

2016/0316059 A1*  10/2016  Nuta .................... G10L 15/04
2020/0020319 A1*  1/2020  Malhotra ............... G10L 15/26

* cited by examiner

*Primary Examiner* — Ibrahim Siddo
(74) *Attorney, Agent, or Firm* — Thomas | Horstemeyer, LLP

(57) ABSTRACT

Disclosed are various approaches for generating a text transcript of a soundtrack. The soundtrack can correspond to an event in a conferencing service. Language models can be trained on data that is specific to organizations, users within the organization, and metadata associated with an agenda for the event. The metadata can include texts, attachments, and other data associated with the event. The language models can be arranged into a convolutional neural network and output a text transcript. The text transcript can be used to retrain the language models for subsequent use.

20 Claims, 4 Drawing Sheets

AUTOMATED CONTEXT-SPECIFIC SPEECH-TO-TEXT TRANSCRIPTIONS

BACKGROUND

In an enterprise setting, individuals can collaborate using conferencing applications and services. In some conferencing services, a speech-to-text feature can be made available that attempts to generate a text transcript of discussions held during a conference for the benefit of the viewer. The text transcript can be generated for the benefit of hearing impaired individuals or for later review by attendees or other users. However, in some scenarios, a text transcript that it generated by a conferencing service or a viewer client associated with the conferencing service often lacks certain context that information to generate a fully accurate transcript.

Additionally, some users may have varying levels of domain expertise and knowledge, which can result in varying needs for a text transcript. For example, some users may require an acronym to be fully expanded while other users may intuitively understand the acronym and may not desire the acronym to be fully expanded in a transcript for efficiency. Accordingly, existing systems and methods that generate text transcripts from a soundtrack can yield inconsistent results depending upon the user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating text transcripts from a soundtrack that can correspond to video in a conferencing service. a text transcript can be generated using a convolutional neural network that includes an organizational specific language model, a user specific language model, and in some examples, an agenda specific language model. the organizational specific language model can be trained to generate a text transcript from a soundtrack and generate the transcript such that organization all specific words, phrases, and acronyms can be easily identified, which can result in a final text transcripts that are highly accurate.

The user specific language model can be tailored for or customized by the user within an enterprise environment so that users can receive a personalized text transcript that takes into account user preferences, a user's role within an organization, and a user's level of expertise or knowledge on a given topic or domain. Additionally, an agenda specific language model can be generated from or trained by metadata associated with an event in a calendar or within the conferencing service. The metadata can be extracted from one or more files attached to an event in a user's calendar, or documents that are shared using the conferencing service. By utilizing a multi layered approach , examples of the disclosure can generate a text transcript from an audio soundtrack that can include potentially highly technical or domain specific words and phrases, that a more generalized language model would be unable to transcribe.

Figure 1:
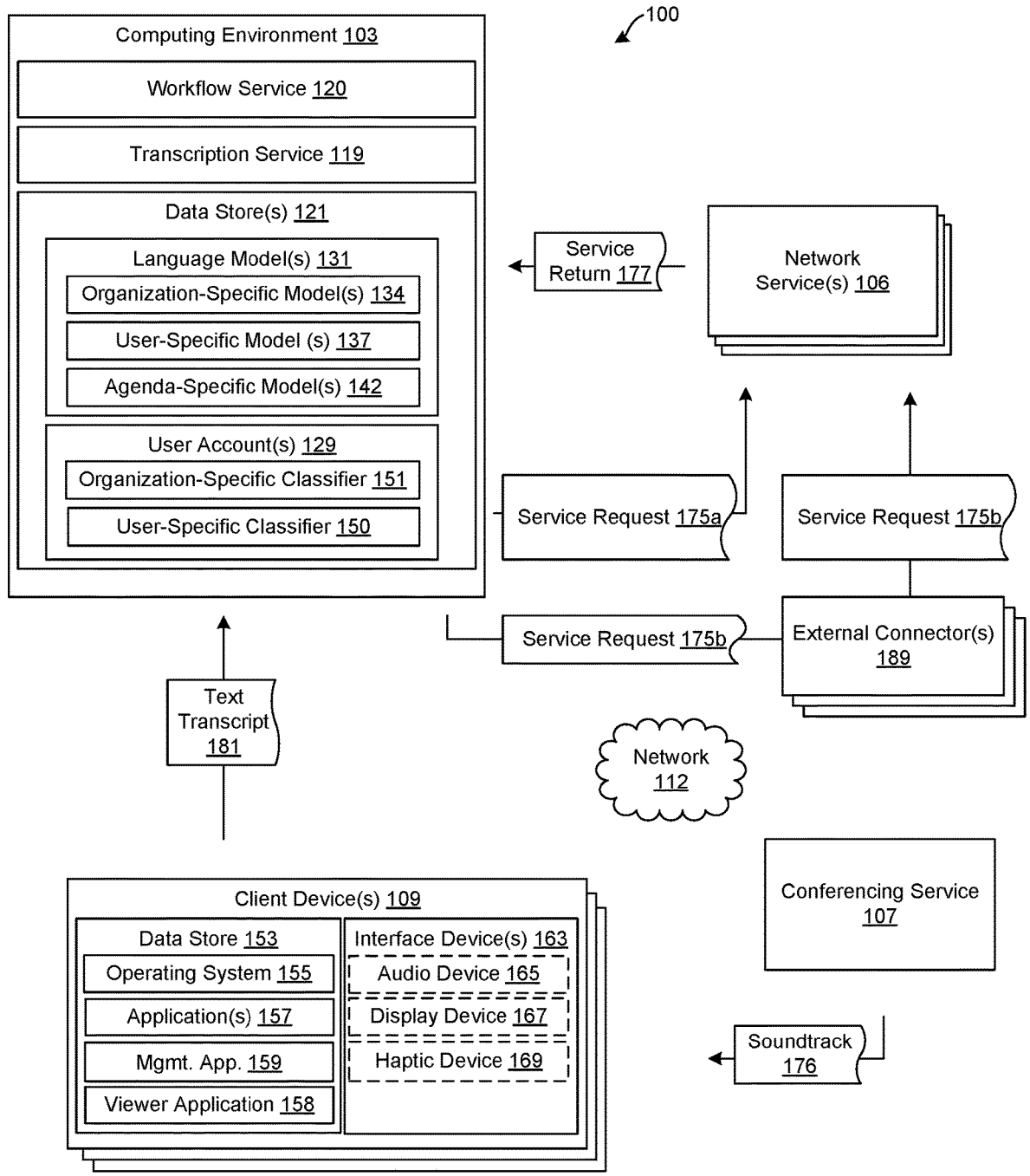
FIG. 1 is a drawing of an example of a networked environment, including client devices, network services, an identity manager service, a workflow service, and other components in communication through a network.

With reference to FIG. 1, shown is an example of a networked environment 100. The networked environment 100 can include a computing environment 103 executing a transcription service 119, workflow service 120, network services 106, conferencing service 107, client devices 109, an enterprise-hosted data store 113, and external connectors 189 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 executing the workflow service 120 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a workflow service 120 as well as other applications, services, processes, systems, engines, or functionality not discussed in detail herein.

The transcription service 119 can generate a text transcript 181 from a soundtrack 176 that is provided as an input. The transcription service 119 can also train language models 131 that are utilized to generate the text transcript 181. The transcription service 119 can utilize a series of language models 131, each of which serves a different purpose. As described herein, a first language model 131 can be organization specific and trained based on terms, acronyms, phrases, etc., that are specific to an organization. A second language model 131 can be user-specific, or at least specific to a group of users as defined by the organization. A third language model 131 can be one that is trained on an agenda that is shared for a particular meeting or event within a conferencing service 107. A text transcript 181 that is output can be provided to a user in real time or after an event concludes.

In some examples, the transcription service 119 can provide the language models 131 to the client device 109, which can generate a text transcript 181 from a soundtrack that is extracted from content received from the conferencing service 107. In this scenario, the language models 131 utilized by the client device 109 to generate the text transcript 181 can be trained by the transcription service 119.

The workflow service 120 can manage enterprise workflows performed by users of the client devices 109. The workflow service 120 can also manage authentication with network services 106 that are utilized as backend services for the workflows. The workflow service 120 can monitor one or more network services 106 that a user is authorized to access. For example, the workflow service 120 can periodically query a network service 106 for notifications, updates, messages, changes, actions to be performed, or other events. If a notification, update, message, change, action to be performed, or other event is identified, the workflow service 120 can then notify the user. For example, the workflow service 120 can send a message to the client device 109 to notify the user. The operating system 155 of the client device 109 can include a notification framework that provides a notification for the message using the client device 109. The notification can include a sound generated using an audio device 165, a visual notification using a display device 167, and haptic feedback using a haptic device 169.

The workflow service 120 can also obtain data from network service 106 and provide the data to the transcription service 119 to train a language model 131, such as an agenda-specific language model 142, an organization-specific language model 134 or a user-specific language model 137. For example, if a user is invited to a meeting hosted using the conferencing service 107, the workflow service 120 can provide metadata from a calendar event, such as text or attachments provided to the invitees, to the transcription service 119.

The workflow service 120 can include authentication functionality, which can include retrieving, caching or storing service authentication data provided by various network services 106. The authentication data can be used to query the network services 106 for information. In some embodiments, use of the workflow service 120 can be invisible to the user.

The data store 121 can include any storage device or medium that can contain, store, or maintain the instructions, logic, or applications described herein for use by or in connection with the computing environment 103. The data store 121 can be a hard drive or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory.

The data store 121 can include memory of the computing environment 103, mass storage resources of the computing environment 103, or any other storage resources on which data can be stored by the computing environment 103. The data stored in the data store 121 can include, for example, a number of user accounts 129, language models 131, and other data that is not depicted and not necessary for a full understanding of examples of the disclosure.

The data store 121 can also store a language model 131. A language model 131 represents a portion of a natural language processing model that can perform speech-to-text conversion to generate a text transcript of an audio input. A language model 131 is a software model that can distinguish between words and phrases in an audio input. The language model 131 can also output a text transcription of the detected words and phrases in the audio input. A language model 131 can be a machine-learning model that is trained on a corpus of user interactions within the enterprise. For example, a language model 131 can represent a node of a neural network that is trained on one or more user interactions, such as user specific data that is available through enterprise messaging services, emails, and other data sources.

Examples of this disclosure can utilize multiple language models in a convolutional neural network to generate accurate text transcript. Accordingly, the data store 121 can include an organization-specific language model 134 and a user-specific language model 137. An organization-specific language model 134 can comprise a language model 131 that is trained using terms, acronyms, phrases, names, and other content that is specific to an organization. For example, in a particular enterprise, there can be terms and phrases that are specialized to or that have special meaning within the enterprise. For example, there can be internal or external product names, proper names, acronyms, and other content that is specific to an organization. Accordingly, an organization-specific language model 134 can be trained to generate a transcription of these words and phrases within an audio input that are inserted into a text transcript. The organization-specific language model 134 can be trained using a corpus of data, such as product pages, documentation, presentations, and other enterprise content that is specific or internal to the organization.

A user-specific language model 137 represents a language model that is trained on data that is specific to a particular user within the enterprise. A user-specific language model 137 can be trained on one or more user interactions, such as user specific data that is available through enterprise messaging services, emails, and other data sources. An agenda-specific language model 142 can be generated for a particular event on a user's calendar or within a conferencing service 107. Accordingly, when a particular user is detected as speaking during an event for which a soundtrack is provided, the user-specific language model 137 can transcribe the words or phrases spoken by the user. The agenda-specific language model 142 can be trained using attachments, text, or other content that is shared by users attending an event or viewing an event in a conferencing service 107. For example, a meeting organizer might include attachments or text in a meeting invitation that is sent to users. The agenda-specific language model 142 can be generated using the attachments or text in the meeting invitation as training material to generate the agenda-specific language model 142.

In some examples of the disclosure, an audio input from which a text transcript is generated can be a soundtrack obtained from a conferencing service 107. A language model 131 can represent a natural language processing model that can comprise portions of a multi-layered neural network, such as a convolutional neural network. The neural network can receive audio as an input and generate a text transcript as an output.

The user accounts 129 can be associated with users of an enterprise. The user accounts 129 can be associated with a directory service that can facilitate user management. The user accounts 129 be associated with authentication data, single sign-on tokens, service records, local connectors, and external connectors. Other information about the user can also be stored as part of the user account 129, such as the user's name, email address, contact information, enterprise responsibilities, and client devices 109. User accounts 129 can also be associated with a user-specific classifier 150. A user-specific classifier 150 can comprise a user customization or correction to a user-specific language model 137.

The user account 129 can identify device data for associated client devices 109. Device data can include one or more of a device identifier, a unique device identifier (UDID), a media access control (MAC) address, an internet protocol (IP) address, or another identifier that uniquely identifies a device with respect to other devices. The device data can include device specifications, and a type of each client device 109. Specifications for the client device 109 can include a hardware configuration that specifies a chipset identifier, a video card identifier, a memory identifier, a monitor or screen identifier, an input device identifier, and a peripheral identifier for each peripheral utilized by the client device 109. Specifications for the client device 109 can include a software configuration that specifies an application identifier for each application installed on the client device 109, a driver or driver version for hardware device and peripheral of the client device 109, an operating system or operating system version installed on the client device 109, and other information. The user account 129 can also include an organizational group of the user account 129 or the client device 109.

An organization-specific classifier 151 can include a rule that modifies the output of the organization-specific language model 134. There can be multiple organization-specific classifiers 151 associated with an organization-specific language model 134. For example, an organization-specific classifier 151 can specify how a particular acronym can be expanded or definitions for words or phrases that might not be apparent or known to some users. A given word or phrase can be associated with more than one organization-specific classifier 151 or user-specific classifier 150. For example, a user in a first group within the organization might not have the same domain expertise as a user in a second group. Accordingly, these users can be associated with different organization-specific classifier 151 that specify that particular words or phrases should be defined or expanded differently depending upon the user who is currently speaking.

A network service 106 can be a web application, web service, or other network facing application. The network service 106 can be federated or associated with a shared identity manager so each can be accessed using the identity manager. One or more network services 106 can be provided by the same provider or by different providers. The network service 106 can receive a service request 175, and provide a service return 177 based on the service request 175. The workflow service 120 can generate a service request 175, or receive a service request 175 from a client device 109. The workflow service 120 can use a local connector or an external connector 189 to provide the service request 175 to the network service 106.

Data obtained from a network service 106 can be utilized to train an organization-specific language model 134 or user-specific language model 137. For example, data obtained from a third party email or message service can be used to train a user-specific language model 137. Data obtained from documentation repository can be used to train an organization-specific language model 134 for a particular group within the enterprise.

The conferencing service 107 can be a third party service or a service that is hosted within the computing environment 103. The conferencing service 107 represents a service in which users can conduct video or audio conferences. Users can join conferences using a client application on a client device 109, by dialing in from a phone, or using a browser-based client. The conferencing service 107 can provide a soundtrack 176 to the transcription service 119 or the workflow service 120, which can in turn provide the soundtrack 176 to the transcription service 119. The transcription service 119 can generate a text transcript 181 of the soundtrack 176, which can display the text transcript 181 in real time in a viewer client associated with the conferencing service 107. Additionally or alternatively, the text transcript 181 can be provided to the user after an event has concluded. In some cases, the text transcript 181 can be saved with a recording of the audio and/or video of the event by the conferencing service 107.

The network service 106 conferencing service 107 can be accessed by the workflow service 120 or the transcription service 119 using a connector, which can be built into the workflow service 120 or transcription service 119. In some cases, external connectors 189 can be utilized. Connectors can refer to services or components that can be configure to fetch information that can be retrieved by the workflow service 120 and/or transcription service 119. In some cases the connectors can be provided using a virtual machine or another virtual resource. Connectors can include local connectors hosted in the computing environment 103, or external connectors 189 hosted external to the computing environment 103. Connectors can handle communications with the network services 106. For example, a connector can fetch user-specific and action-specific information from network services 106 or the conferencing service 107.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 109 can have an operating system that can perform functionalities and execute applications. The operating system 155 can be stored in a data store 153 that also includes applications 157, a management application 159, and other data. The client device 109 can execute the client management application 159 to perform or access the functionality described for the workflow service 120. The client device 109 can be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine, a voice activated smart device, or a kiosk that is in a particular location or is not easily portable. The client device 109 can include user interface devices 163 that can be utilized to interact with users. The user interface devices 163 can include audio devices 165, display devices 167, and haptic devices 169.

The operating system 155 of the client device 109 can execute various client functionalities or client applications 157, such as a management application 159, a browser application, a voice interaction functionality, or another application. The operating system 155 and some applications 157 can access network content served up by the computing environment 103, or other servers and can present this information to a user through one or more of the user interface devices 163. For example, the client device 109 can render a user interface on a display, such as a liquid crystal display (LCD), organic light emitting diode (OLED) display, touch-screen display, or other type of display device. The client device 109 can also present audio information using the audio device 165 and can provide haptic or physical feedback using the haptic device 169.

Some applications 157 can include a browser or a dedicated application, and a user interface can include a network page, an application screen, or other interface. The client device 109 can also access web applications using the browser application. Further, other applications 157 can include device management applications, enterprise applications, social networking applications, word processors, spreadsheet applications, media player applications, or other applications. In some cases, an application 157 can comprise a client for the conferencing service 107 through which users can host or attend events that are hosted using the conferencing service 107.

In this scenario, a meeting organizer can create an event on a calendar and invite users to the event. The event can be associated with metadata, such as text or attachments that are distributed to the attendees. When the meeting or event commences in the conferencing service 107, a soundtrack 176 can be streamed or provided to the transcription service 119, which can generate a text transcript 181 using one or more language model 131 and/or classifiers that can facilitate the creation of accurate text transcript 181. In one implementation, the transcription service 119 can implement a convolutional neural network (CNN) that can utilize various language models 131 to generate the text transcript 181. Other neural network or machine learning models can also be utilized that take advantage of the language model 131 and other classifiers for further customization.

A viewer application 158 represents an application that is utilized to access events or content from the conferencing service 107. The viewer application 158 can be a client application through which the user can join events, view video from other users who have joined the event, listen to audio shared during the event, and consume or share other content, such as documents, screen-sharing and other features that are utilized in a conferencing service 107.

In some examples, the viewer application 158 can receive video and/or audio from the conferencing service 107 and render the content on the client device 109. Additionally, the viewer application 158 can generate a text transcript 181 using a CNN that employs language models 131 provided by the transcription service 119 for the user. The text transcript 181 can be displayed by the viewer application 158. The text transcript 181 can also be sent back to the transcription service 119 to further train the language models 131 that are utilized in the CNN. The viewer application 158 can periodically obtain updated language models 131 from the transcription service 119 or for each event viewed using the viewer application 158. The updated language models 131 can be trained and retrained using various text transcripts 181 that are provided to the transcription service 119.

Figure 2:
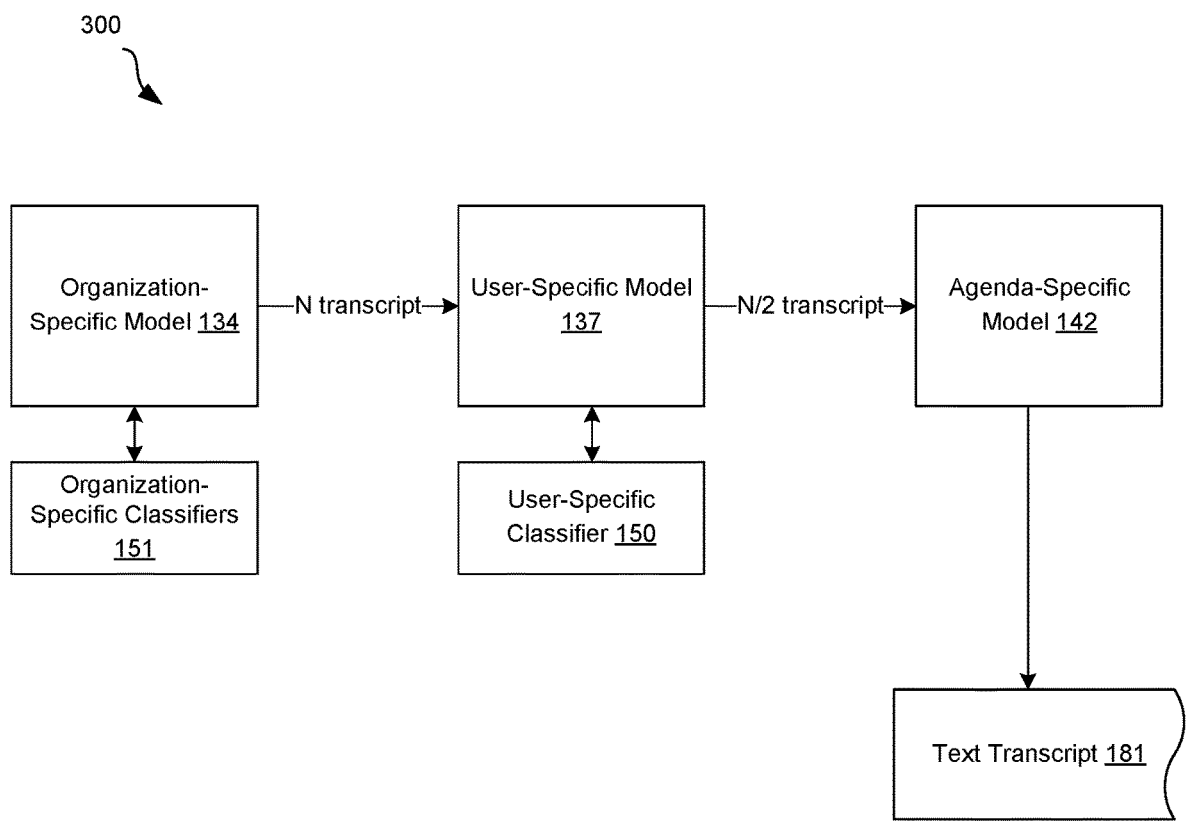
FIG. 2 is a drawing illustrating a neural network utilizing language models according to examples of the disclosure.

FIG. 2 shows an example CNN 300 that can be assembled using language models 131 that are trained by the transcription service 119. The CNN 300 can utilize a series of language models 131 that transcribe a soundtrack 176 provided as an input to the CNN 300. A first layer of the CNN 300 can be implemented by the organization-specific language model 134 associated with a user. In some examples, the organization-specific language model 134 can be selected based upon a group within the organization the user is in. For example, the transcription service 119 or viewer application 158 can determine a group within a directory service of the enterprise in which the group is assigned, which can in turn be associated with a particular organization-specific language model 134. Additionally, organization-specific classifiers 151 can also be selected by the transcription service 119 or the viewer application 158 depending upon the group within an organization in which the user is a member.

For example, different people belonging to different groups within an organization can attend the same event. The meeting content involves slides and language specific to each person and includes organization-specific terminology (e.g., acronyms, product names, etc.) with which some attendees in certain groups within an organization may not be familiar. The CNN 300 utilizes the depicted multi-tier pipeline and provides an accurate transcription of the vocabulary used. The organization-specific classifier 151 for a particular user in a given group within the organization can expand upon or define certain terminology that a user in a different group may not require. Additional contextual information provided can be used by other members of the call in real-time so they can follow along without having to research anything that is mentioned during the meeting.

In some examples, a language model 131 can be selected based upon the identity of the user speaking. The viewer application 158 or the conferencing service 107 can determine based upon the identity of the event attendees who is speaking a any given time. Accordingly, based on the identity of the user speaking, the corresponding models are loaded and used for inferencing. When a first user is speaking, the organization-specific language model 134 corresponding to that user can be loaded into the CNN 300. When a second user is speaking, the organization-specific language model 134 for that other user can be loaded into the CNN 300 and utilized for inferencing.

Similarly, a user-specific language model 137 that corresponds to the currently speaking user can be loaded into the CNN 300. When a first user is speaking, the user-specific language model 137 corresponding to that user can be loaded into the CNN 300. When a second user is speaking, the user-specific language model 137 for that other user can be loaded into the CNN 300 and utilized for inferencing. Additionally, user-specific classifiers 150 can also be selected by the transcription service 119 or the viewer application 158 depending upon the user who is currently speaking.

These models can be deployed in series such that the transcript hypotheses are ranked accordingly at each level allowing the text transcript 181 to be the most accurate transcript. As shown in FIG. 2, the organization-specific language model 134 and user-specific language model 137 can include a main neural network head that can the feature from speech. The organization-specific language model 134 and user-specific language model 137 can have respective organization-specific classifiers 151 and user-specific classifiers 150 that can refine the generated transcript according to preferences or selections of the viewing user. In this way, each user does not require his or her own fully trained neural network, and we can feed the output from the model heads to the final layer classifier, which can generate the transcript for the specific organization-specific language model 134 or user-specific language model 137 before the transcript is passed to the next level in the CNN 300. The organization-specific language model 134 can be assigned as the head of the CNN 300.

The user-specific language model 137 can feed the output of its processing to the agenda-specific language model 142 that can be generated based upon the metadata associated with the event. As noted above, the metadata can comprise text associated with an invitation to an event, text, documents or images associated with the event in the conferencing service 107, or attachments to the invitation to the event. The metadata can be provided to the transcription service 119 when the event is created within a user's calendar or within the conferencing service 107. The transcription service 119 can then generate or train an agenda-specific language model 142, which can be provided to the viewer application 158. Using the agenda-specific language model 142, the viewer application 158 can generate a text transcript 181, which can be displayed to the user through the viewer application 158 in real time or after the event.

Additionally, the text transcript 181 can be provided back to the transcription service 119 which can retrain and refine an organization-specific language model 134 corresponding to an organization as well as retrain user-specific language models 137 that correspond to attendees of the meeting that were speaking. In some examples, the transcription service 119 can generate a text transcript 181 using a subtitling application programming interface (API) that can generate subtitles based upon a text input provided by the CNN 300.

The subtitling API can also allow a user or the transcription service 119 to select a verbosity mode. For example, a given word can be associated with a first definition in a verbose mode and a shorter definition in a less verbose mode. The user or the transcription service 119 can select a verbose or non-verbose mode when requesting a text transcript of a soundtrack provided to the transcription service 119.

In some examples, a verbosity mode can be selected by the transcription service 119 based upon a respective user's group, team, or role within an enterprise. The verbosity mode can also be selected based upon previous acronyms that have been provided to the respective user in the current or a previous transcript.

The transcription service 119 can also incorporate data from other sources to augment a text transcript 181 generated by the transcription service 119. For example, transcription service 119 can generate actionable user interface elements that can be overlaid into a user interface through which a user is viewing content from the conferencing service 107. For example, if during a call, the host talks about revenue generated during a previous quarter and mentions a specific customer, the transcription service 119 can request additional content from a network service 106 on behalf of the user and make the subtitles interactive by allowing the guests to interact with content from the network service 106. Similarly, if a data item in a network service 106, such as a bug tracking service, is mentioned by name, the transcription service 119 can execute a connector to retrieve and show the data item to show the ticket to the user.

As another example, the transcription service 119 can perform optical character recognition (OCR) on content shown in the conferencing service 107 and make the content interactive. For example, embedded content on PowerPoints can be made clickable where possible. If an embedded video is streamed by the host, a popup can be displayed on top to allow each guest to open up the video on their side to view it instead of viewing the video through the conferencing service 107.

Figure 3:
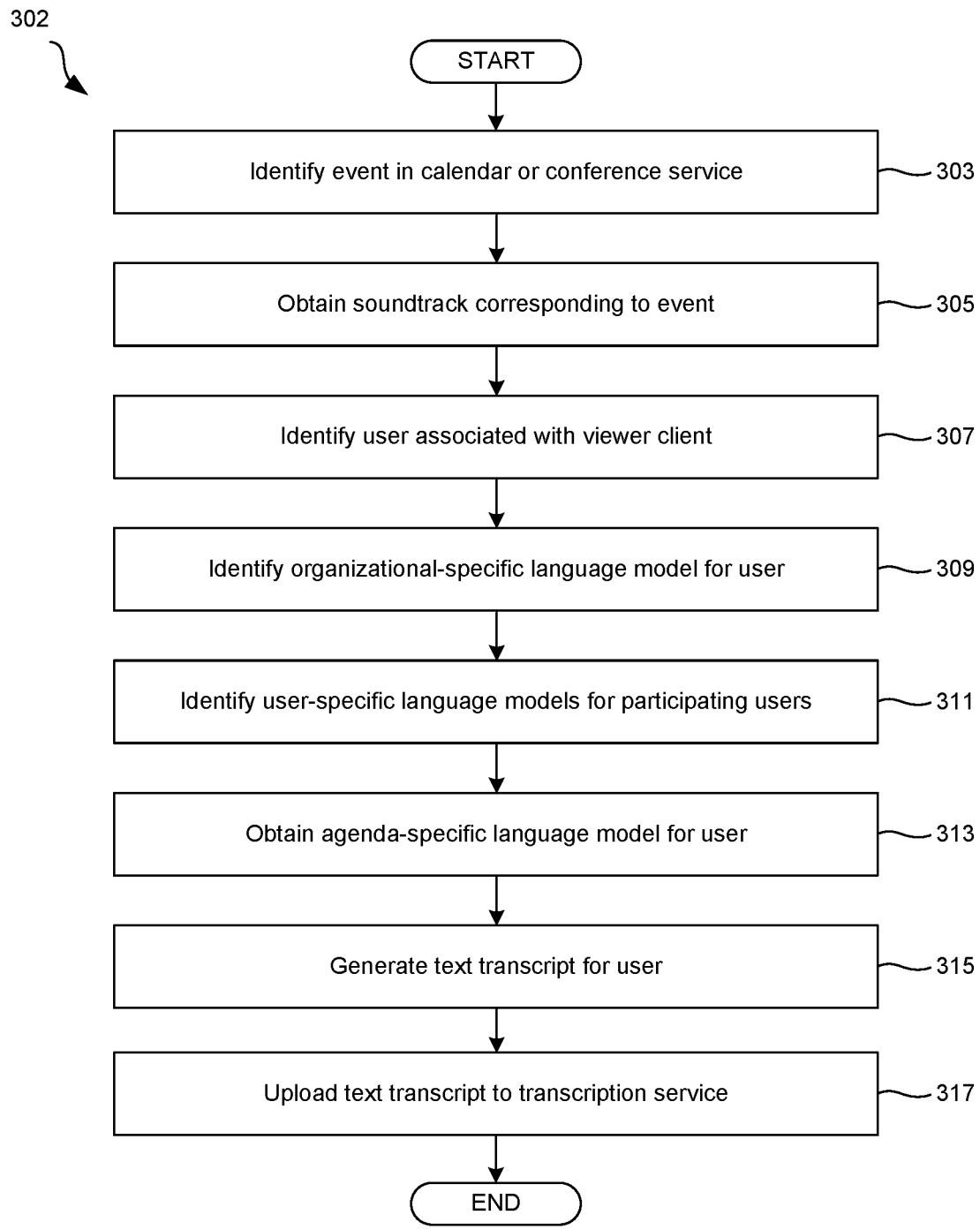
FIG. 3 is a flowchart outlining functionalities implemented by the workflow service and other components of the networked environment.

Referring next to FIG. 3, shown is a flowchart 302 describing steps that can be performed by the components of the networked environment 100. Generally, the flowchart 302 describes how the viewer application 158 or the transcription service 119 can generate a text transcript 181 using a CNN 300 or language models 131 according to examples of the disclosure.

At step 303, the viewer application 158 can identify an event in a calendar of a user or group. The even can also be identified in a conferencing service 107. The event can be one to which various users within an organization are invited. In one example, the transcription service 119 can also obtain an indication of the event on a user's calendar and determine whether a user-specific language model 137 exists for the user. If no user-specific language model 137 exists for the attendees of the event, the transcription service 119 can generate the user-specific language model 137.

At step 305, the viewer application 158 can obtain a soundtrack 176 corresponding to the event. The soundtrack 176 can correspond to video content that is rendered by the viewer application 158 during the event. The video content can be associated with a videoconference hosted by the conferencing service 107. The soundtrack 176 can be an input into a CNN 300 that is implemented by the viewer application 158 to generate a text transcript 181 associated with the soundtrack 176.

At step 307, the viewer application 158 can identify a user associated with the viewer application 158. The viewer application 158 can identify the currently logged in user.

At step 309, the viewer application 158 can identify an organization-specific language model 134 associated with the currently logged in user. The organization-specific language model 134 can specify how to generate a text transcript 181 from a soundtrack 176 provided as an input from the conferencing service 107. The organization-specific language model 134 can be trained on a data set that includes organization-specific terminology as well as based on other speech recognition data so that an accurate text transcript 181 can be generated for the user. The organization-specific language model 134 can transcribe words or phrases that might be specific or unique to an organization. Because the organization-specific language model 134 can be trained on domain-specific content, the organization-specific language model 134 can generate a highly accurate text transcript 181 from a soundtrack 176 associated with an event.

At step 311, the viewer application 158 can identify one or more user-specific language models 137 associated with users attending the event in the conferencing service 107. The attending users can be identified by querying the conferencing service 107 using a network call provided by the conferencing service 107. Upon identifying the attending users of the event, the viewer application 158 can request the respective user-specific language model 137 for the attending users so that the viewer application 158 can transcribe words or phrases spoken by those users. As noted above, a user-specific language model 137 can be generated for each user in the organization. In some examples, a user-specific language model 137 might not be created for each user in the organization. In this scenario, various user-specific classifiers 150 can be utilized for each user to refine the output of a generalized user-specific language model 137 that is utilized.

At step 313, the viewer application 158 can obtain an agenda-specific language model 142 for the event in the conferencing service 107. The agenda-specific language model 142 can be generated by the transcription service 119 based upon metadata associated with the event. As noted above, the metadata can include documents or other attachments included in a meeting invitation. The metadata can include documents or other attachments associated with the event that are stored in the conferencing service 107. The agenda-specific language model 142 can be generated by the transcription service 119 and provided to the viewer application 158 when the event commences.

At step 315, the viewer application 158 can generate the text transcript 181. The text transcript 181 can be displayed within the viewer application 158 during the event or provided to the user after the event. The viewer application 158 can utilize the language models 131 provided to the viewer application 158 to implement a neural network, such as the CNN 300. In some examples, the CNN 300 can also obtain user-specific classifiers 150 and/or organization-specific classifiers 151 associated with the language models 131 provided to generate the text transcript 181.

To generate the text transcript 181, the viewer application 158 can identify the currently speaking user and identify an organization-specific language model 134 and/or organization-specific classifiers 151 corresponding to the user. The viewer application 158 can also identify the user-specific language model 137 and/or user-specific classifier 150 corresponding to the currently speaking user. The viewer application 158 can also identify the agenda-specific language model 142 corresponding to the event. The viewer application 158 can utilize the identified language models 131 and classifiers, such as in a CNN 300 shown in FIG. 2 and generate a text transcript 181 corresponding to the soundtrack 176 obtained at step 305.

At step 317, the viewer application 158 can upload the text transcript 181 to the transcription service 119. In some implementations, the transcription service 119 can update or retrain the language models 131 that were utilized to generate the text transcript 181 from the soundtrack 176. Additionally, the text transcript 181 can be archived in the data store 121 by the transcription service 119 for later retrieval by a user. Thereafter, the process proceeds to completion. In some implementations of the disclosure, the process of generating a text transcript 181 can be performed remotely from the viewer application 158, such as by the transcription service 119 or the conferencing service 107. In this scenario, the CNN 300 can be implemented in the transcription service 119 or the conferencing service 107 and output a text transcript 181 that can be displayed by the viewer application 158.

Figure 4:
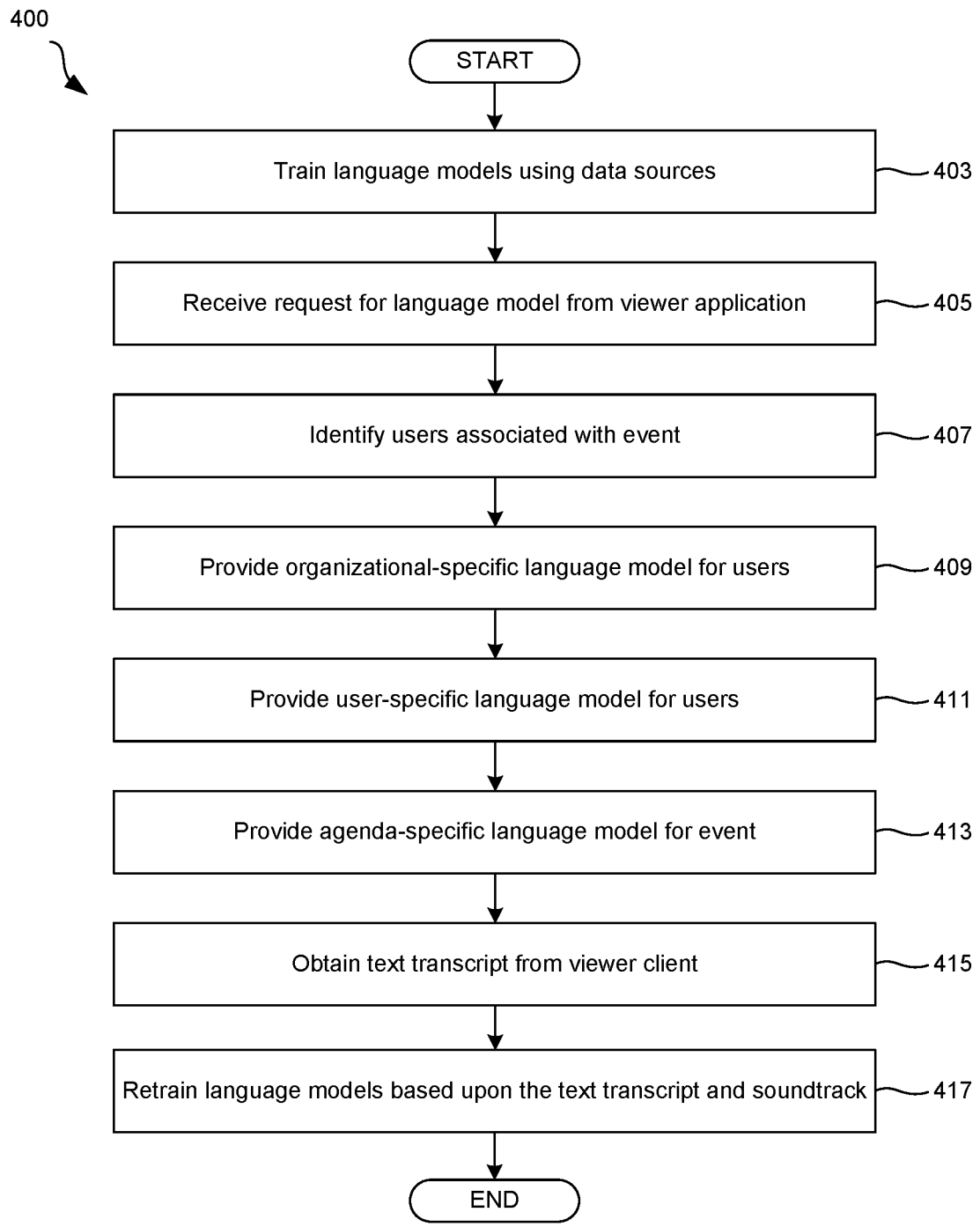
FIG. 4 is another flowchart outlining functionalities implemented by the workflow service and other components of the networked environment.

FIG. 4 shows an example flowchart 400 describing steps that can be performed by the transcription service 119. Generally, the flowchart 400 describes how the transcription service 119 can provide language models 131 to a viewer application 158 for the purpose of generating a text transcript 181.

At step 403, the transcription service 119 can train one or more language models 131 using various data sources. As noted above, an organization-specific language model 134 can be trained using organization-specific data that may include organization-specific terminology, acronyms, and the like. The organization-specific language model 134 corresponding to the organization can also be trained using previous text transcripts 181 generated using the organization-specific language model 134. In this scenario, the text transcript 181 and other data sources can be provided as an input to a language model 131 training process.

A user-specific language model 137 can be trained using data sources specific to a user, such as publications of the user, email messages, or other writings. The user-specific language model 137 corresponding to the user can also be trained using previous text transcripts 181 generated using the user-specific language model 137. The data sources specific to the user can be provided as an input to a language model 131 training process.

The transcription service 119 can also train an agenda-specific language model 142 corresponding to an event in the conferencing service 107. The agenda-specific language model 142 can be trained using metadata associated with the event in the conferencing service 107 or in a calendar invitation referencing the event. The metadata can be provided as an input to a language model 131 training process.

At step 405, the transcription service 119 can receive a request for one or more language models 131 from a viewer application 158. The viewer application 158 can be running on a client device 109. The viewer application 158 can request language models 131 corresponding to users who are attending an event hosted using the conferencing service 107.

At step 407, the transcription service 119 can identify the users associated with the event. The users associated with the event are users who have been invited to the event. The users can be identified by the viewer application 158, and an identifier associated with the users provided to the transcription service 119 by the viewer application 158.

At step 409, the transcription service 119 can identify an organization-specific language model 134 for one or more users invited to or attending the event. The organization-specific language models 134 can be identified in the data store 121. The transcription service 119 can provide the organization-specific language models 134 to the viewer application 158. In some examples, the transcription service 119 can also identify one or more organization-specific classifier 151 to the viewer application 158.

At step 411, the transcription service 119 can identify a user-specific language model 137 for one or more users invited to or attending the event. The user-specific language models 137 can be identified in the data store 121. The transcription service 119 can provide the user-specific language models 137 to the viewer application 158. In some examples, the transcription service 119 can also identify one or more user-specific classifier 150 to the viewer application 158.

At step 413, the transcription service 119 can identify the agenda-specific language model 142 generated for the event to the viewer application 158. The viewer application 158 can then generate a text transcript 181 corresponding to an event using the provided language models 131 and classifiers.

At step 415, the viewer application 158 can obtain a text transcript 181 from the viewer application 158. The text transcript 181 can be generated by a CNN 300 that utilizes the language models 131 provided to the viewer application 158 by the transcription service 119.

At step 417, the transcription service 119 can retrain the language models 131 using the text transcript 181. The language models 131 can be provided as an input for a language model 131 training process. Thereafter, the process proceeds to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by an application 157, workflow service 120, or another application can be rendered. In some examples, the user interface can be generated with user interface data provided by the computing environment 103. The client devices 109 can also include one or more input/output devices that can include, for example, a capacitive touchscreen or other type of touch input device, fingerprint reader, or keyboard.

Although the workflow service 120, client applications 157, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
   a computing device comprising at least one processor and at least one memory; and
   machine-readable instructions stored in the at least one memory, wherein the instructions, when executed by the at least one processor, cause the computing device to at least:
   identify an event in at least one of a user calendar or a conferencing service;
   obtain a soundtrack corresponding to a video input, the video input obtained from the conferencing service, the video input further being associated with a viewer displaying the video input to a user;
   identify an organization-specific language model associated with at least one user invited to the event;
   identify a user-specific language model associated with the at least one user invited to the event;

identify an agenda-specific language model associated with the event, the agenda-specific language model generated using metadata associated with the event and wherein the organization-specific language model, the user-specific language model, and the agenda-specific language model comprise a convolutional neural network; and generate a text transcript based upon the soundtrack from the video input using the convolutional neural network.

2. The system of claim 1, wherein the organization-specific language model further comprises organizational-specific classifiers that specify how to generate the text transcript based upon organization wide rules.

3. The system of claim 1, wherein the user-specific language model further comprises user-specific classifiers that specify how to generate the text transcript based upon user-specified rules.

4. The system of claim 1, wherein the metadata associated with the event comprises an event description or at least one document associated with the event.

5. The system of claim 1, wherein the organization-specific language model comprises a head of the convolutional neural network.

6. The system of claim 1, wherein the organization-specific language model is trained to expand on a plurality of organization-specific acronyms that are inserted into the text transcript.

7. The system of claim 1, wherein the convolutional neural network is configurable to generate an abbreviated text transcript or a verbose text transcript.

8. A non-transitory computer-readable medium comprising machine-readable instructions, wherein the instructions, when executed by at least one processor, cause a computing device to at least:

identify an event in at least one of a user calendar or a conferencing service;

obtain a soundtrack corresponding to a video input, the video input obtained from the conferencing service, the video input further being associated with a viewer displaying the video input to a user;

identify an organization-specific language model associated with at least one user invited to the event;

identify a user-specific language model associated with the at least one user invited to the event;

identify an agenda-specific language model associated with the event, the agenda-specific language model generated using metadata associated with the event and wherein the organization-specific language model, the user-specific language model, and the agenda-specific language model comprise a convolutional neural network; and generate a text transcript based upon the soundtrack from the video input using the convolutional neural network.

9. The non-transitory computer-readable medium of claim 8, wherein the organization-specific language model further comprises organizational-specific classifiers that specify how to generate the text transcript based upon organization wide rules.

10. The non-transitory computer-readable medium of claim 8, wherein the user-specific language model further comprises user-specific classifiers that specify how to generate the text transcript based upon user-specified rules.

11. The non-transitory computer-readable medium of claim 8, wherein the metadata associated with the event comprises an event description or at least one document associated with the event.

12. The non-transitory computer-readable medium of claim 8, wherein the organization-specific language model comprises a head of the convolutional neural network.

13. The non-transitory computer-readable medium of claim 8, wherein the organization-specific language model is trained to expand on a plurality of organization-specific acronyms that are inserted into the text transcript.

14. The non-transitory computer-readable medium of claim 8, wherein the convolutional neural network is configurable to generate an abbreviated text transcript or a verbose text transcript.

15. A method comprising:

identifying an event in at least one of a user calendar or a conferencing service;

obtaining a soundtrack corresponding to a video input, the video input obtained from the conferencing service, the video input further being associated with a viewer displaying the video input to a user;

identifying an organization-specific language model associated with at least one user invited to the event;

identifying a user-specific language model associated with the at least one user invited to the event;

identifying an agenda-specific language model associated with the event, the agenda-specific language model generated using metadata associated with the event and wherein the organization-specific language model, the user-specific language model, and the agenda-specific language model comprise a convolutional neural network; and generating a text transcript based upon the soundtrack from the video input using the convolutional neural network.

16. The method of claim 15, wherein the organization-specific language model further comprises organizational-specific classifiers that specify how to generate the text transcript based upon organization wide rules.

17. The method of claim 15, wherein the user-specific language model further comprises user-specific classifiers that specify how to generate the text transcript based upon user-specified rules.

18. The method of claim 15, wherein the metadata associated with the event comprises an event description or at least one document associated with the event.

19. The method of claim 15, wherein the organization-specific language model comprises a head of the convolutional neural network.

20. The method of claim 15, wherein the organization-specific language model is trained to expand on a plurality of organization-specific acronyms that are inserted into the text transcript.

* * * * *